(12) United States Patent
Callahan et al.

(10) Patent No.: US 8,297,659 B2
(45) Date of Patent: Oct. 30, 2012

(54) QUICK CONNECTOR ASSEMBLY

(75) Inventors: Douglas John Callahan, Rochester Hills, MI (US); Juris Julijs Pruzinskis, Janesville, WI (US); Steve Mixter, Howell, MI (US); Michael Longhenry, Waiworth, WI (US); Brent J. Ertl, Darien, WI (US)

(73) Assignee: Miniature Precision Components, Inc., Walworth, WI (US)

( * ) Notice: Subject to any disclaimer, the term of this patent is extended or adjusted under 35 U.S.C. 154(b) by 66 days.

(21) Appl. No.: 13/031,846

(22) Filed: Feb. 22, 2011

(65) Prior Publication Data

US 2012/0211977 A1 Aug. 23, 2012

(51) Int. Cl.
 *F16L 35/00* (2006.01)
(52) U.S. Cl. .................. 285/93; 285/319; 285/305
(58) Field of Classification Search .............. 285/93, 285/319, 305
 See application file for complete search history.

(56) References Cited

U.S. PATENT DOCUMENTS

| | | |
|---|---|---|
| 4,943,091 A | 7/1990 | Bartholomew |
| 4,948,176 A | 8/1990 | Bartholomew |
| 5,112,084 A | 5/1992 | Washizu |
| 5,161,832 A | 11/1992 | McNaughton et al. |
| 5,161,833 A | 11/1992 | McNaughton et al. |
| 5,297,818 A | 3/1994 | Klinger |
| 5,324,082 A | 6/1994 | McNaughton et al. |
| 5,441,313 A | 8/1995 | Kalahasthy |
| 5,499,848 A | 3/1996 | Kujawski |
| 5,551,732 A | 9/1996 | Bartholomew |
| 5,607,190 A | 3/1997 | Exandier et al. |
| 5,626,371 A | 5/1997 | Bartholomew |
| 5,785,358 A | 7/1998 | Kujawski et al. |
| 6,089,616 A | 7/2000 | Trede et al. |
| 6,129,393 A | 10/2000 | Kodama et al. |
| 6,173,998 B1 | 1/2001 | Bock |
| 6,186,561 B1 | 2/2001 | Kaishio et al. |
| 6,250,692 B1 | 6/2001 | Ito et al. |
| 6,328,344 B1 * | 12/2001 | Tozaki et al. .......... 285/93 |
| 6,402,204 B1 | 6/2002 | Stuart et al. |
| 6,428,055 B1 | 8/2002 | Moretti et al. |
| 6,543,814 B2 | 4/2003 | Bartholomew |
| 6,851,721 B2 | 2/2005 | Poder |
| 6,971,684 B2 | 12/2005 | Ferrari |

(Continued)

FOREIGN PATENT DOCUMENTS

DE 3924173 A1 * 1/1991

*Primary Examiner* — Aaron Dunwoody
(74) *Attorney, Agent, or Firm* — Dickinson Wright PLLC (57) ABSTRACT

The quick connector assembly includes an insertion member that is inserted along a longitudinal axis into a receiving member. A retaining member is disposed in the receiving member for movement in a direction of insertion that is perpendicular to the longitudinal axis. A positioning member is disposed in the receiving member and includes a biasing portion that extends angularly from a base portion to a pair of blocking portions. The blocking portions move between an extended position and a retracted position and are oriented opposite the direction of insertion of the retaining member to block the retaining member from moving into a fully inserted position when the biasing portion is in the extended position. An annular collar of the insertion member engages the blocking portions when the insertion member is axially inserted in the receiving member to move the blocking portions into the retracted position. As a result, the retaining member is free to be moved into the fully inserted position to secure the insertion member relative to receiving member.

18 Claims, 5 Drawing Sheets

U.S. PATENT DOCUMENTS

| | | |
|---|---|---|
| 7,344,166 B2 | 3/2008 | Ketcham et al. |
| 7,455,327 B2 | 11/2008 | Lorenz |
| 2005/0236833 A1* | 10/2005 | Poirier et al. .................. 285/305 |
| 2006/0082145 A1* | 4/2006 | Steveley ....................... 285/305 |
| 2007/0200339 A1 | 8/2007 | Yagisawa et al. |
| 2008/0007053 A1* | 1/2008 | Kerin et al. ................... 285/305 |
| 2010/0032937 A1* | 2/2010 | Kerin et al. ....................... 285/3 |
| 2010/0276924 A1* | 11/2010 | Gillet et al. ..................... 285/93 |

* cited by examiner

QUICK CONNECTOR ASSEMBLY

BACKGROUND OF THE INVENTION

1. Field of the Invention

A quick connector assembly for securing an insertion member within a receiving member to convey fluids between the insertion member and the receiving member.

2. Description of the Prior Art

Quick connector assemblies are used prevalently for connecting fuel tubes of automotive fuel systems to establish a continuous flow path therebetween. For example, in automotive applications, quick connectors are used in various air/vapor management systems such as evaporative emissions systems, crankcase ventilation systems, and brake boost and engine vacuum systems. In addition to these gas management systems, quick connectors can also be used in fluid delivery systems such as, for example, liquid fuel and windshield washer applications. Quick connector assemblies are capable of quickly and simply connecting tubes or conduits to one another. Quick connector assemblies secure an insertion member within a receiving member to convey fluids through the insertion and receiving members. Various quick connector assemblies are well known.

One known quick connector assembly includes a retaining member for holding an insertion member in a receiving member. The retaining member is inserted perpendicular to a longitudinal axis to secure the insertion member relative to the receiving member. The receiving member includes a blocking part that is unitary with the receiving member and includes a pair of blocking edges that extend to the axial bore defined in the receiving member to block the movement of the retaining member. The retaining member includes a pair of unitary verifying legs that are orientated in the direction of insertion and engage the blocking edges to block the movement of the retaining member. The verifying legs are moved outwardly away from each other by the annular collar of the insertion member, when the insertion member is pressed a sufficient distance into the receiving member. As a result of this outward movement, the verifying legs are no longer blocked by the blocking member, and the retaining member may be inserted to engage the insertion member and secure the insertion member relative to the receiving member.

Another such quick connector assembly includes a retaining member for keeping an insertion member in a receiving member. The retaining member is inserted perpendicular to a longitudinal axis to secure the insertion member relative to the receiving member. The receiving member includes a latching projection that is unitary with the receiving member to block the movement of the retaining member. The retaining member includes a pair of unitary latching arms that are orientated perpendicular to the direction of insertion and biased upwardly to engage the latching projection and block the movement of the retaining member. The latching arms are moved downwardly by the annular collar of the insertion member, when the insertion member is pressed a sufficient distance into the receiving member. As a result of this downward movement, the latching arms are no longer blocked by the latching projection, and the retaining member may be inserted to engage the insertion member and secure the insertion member relative to the receiving member.

SUMMARY OF THE INVENTION

The present invention relates to a quick connector assembly that secures an insertion member within a receiving member to convey fluids between the insertion member and the receiving member. The receiving member includes an axial bore that extends along a longitudinal axis between a receiving member top and a receiving member bottom. A retaining slot is defined by the receiving member and extends perpendicularly to the longitudinal axis and through the receiving member. The insertion member includes an annular collar that extends outwardly from a shaft portion. The insertion member is axially inserted within the axial bore of the receiving member. A retaining member is disposed in the receiving member for movement in the retaining slot. The retaining member is moveable to a fully inserted position in a direction of insertion. The retaining member engages the insertion member when the insertion member is in the fully inserted position and secures the insertion member relative to receiving member.

A positioning member is disposed in the axial bore and includes a base portion and a biasing portion biased towards the receiving member top. The positioning member is a separate and distinct structure from both the receiving member and retaining member. The biasing portion extends angularly from the base portion to a pair of blocking portions. The blocking portions are movable between an extended position and a retracted position. The blocking portions are oriented opposite the direction of insertion of the retaining member to block the retaining member from moving into the fully inserted position when the biasing portion is in the extended position. The annular collar of the insertion member engages the blocking portions of the positioning member when the insertion member is axially inserted in the axial bore in a direction opposite the bias of the biasing portion. The annular collar moves the blocking portions away from the retaining slot and into the retracted position. As a result, the retaining member is free to be moved into the fully inserted position and proper assembly of the quick connector assembly is assured.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
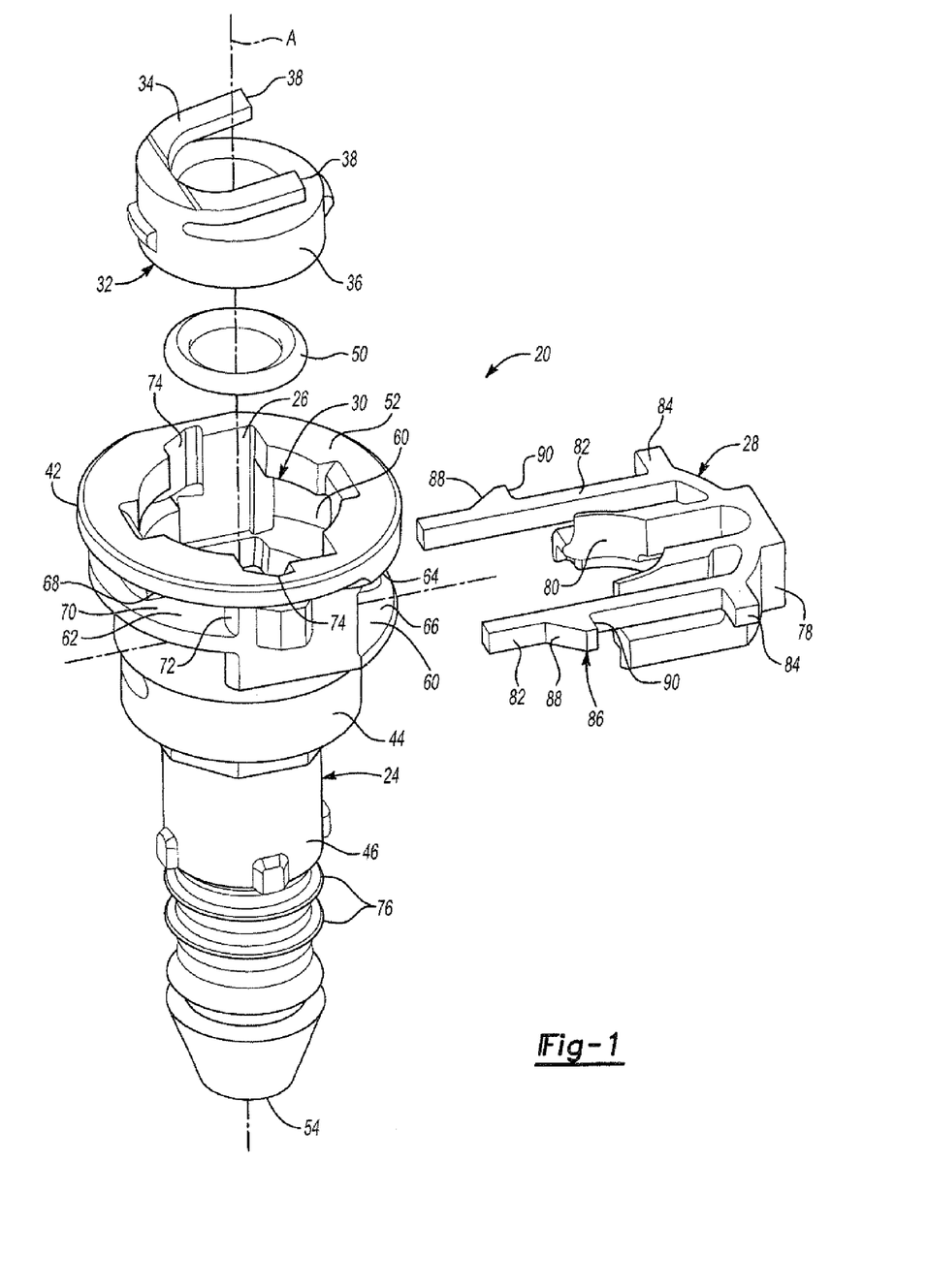
FIG. 1 is an exploded perspective view of a quick connector assembly according to the subject invention.
Figure 2:
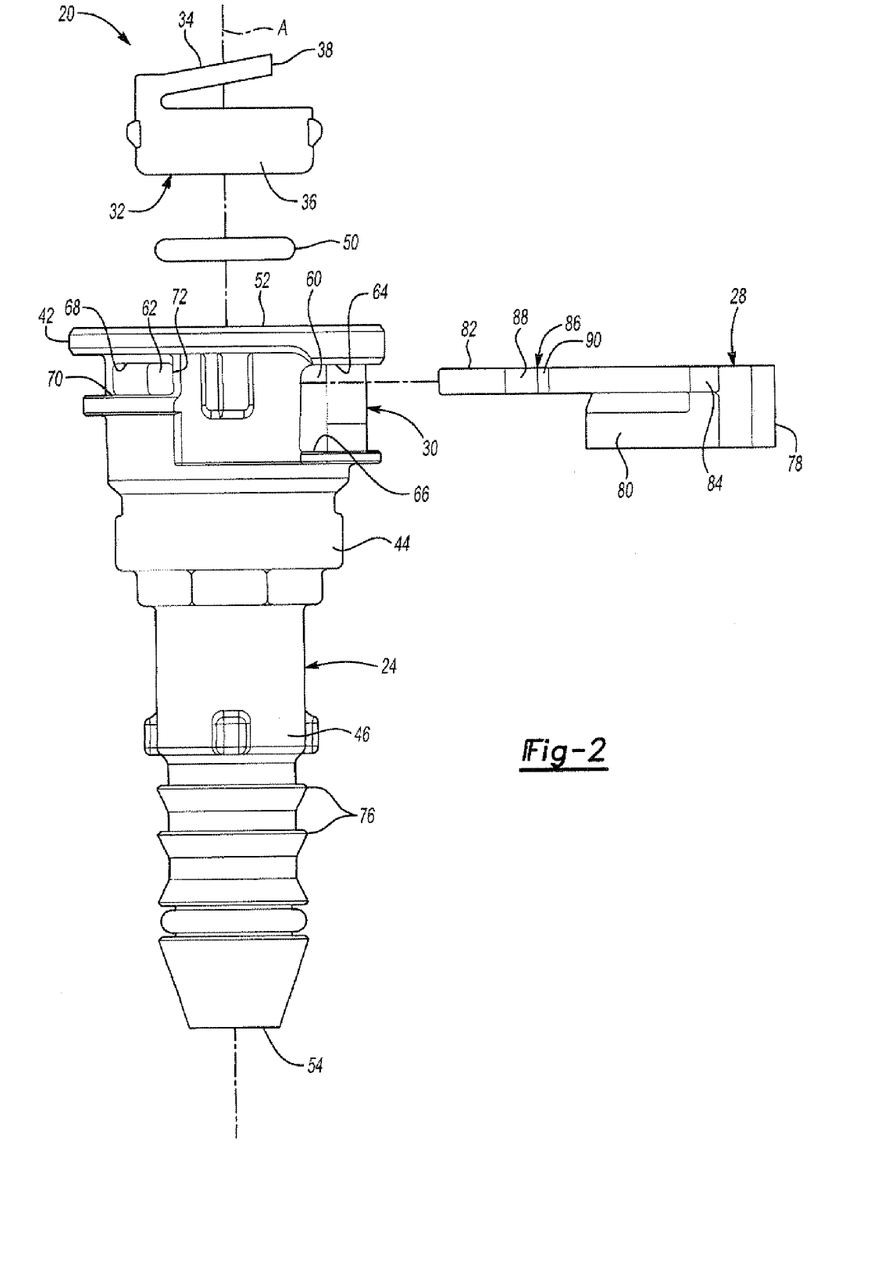
FIG. 2 is an exploded side view of the quick connector assembly according to the subject invention.
Figures 3, 4:
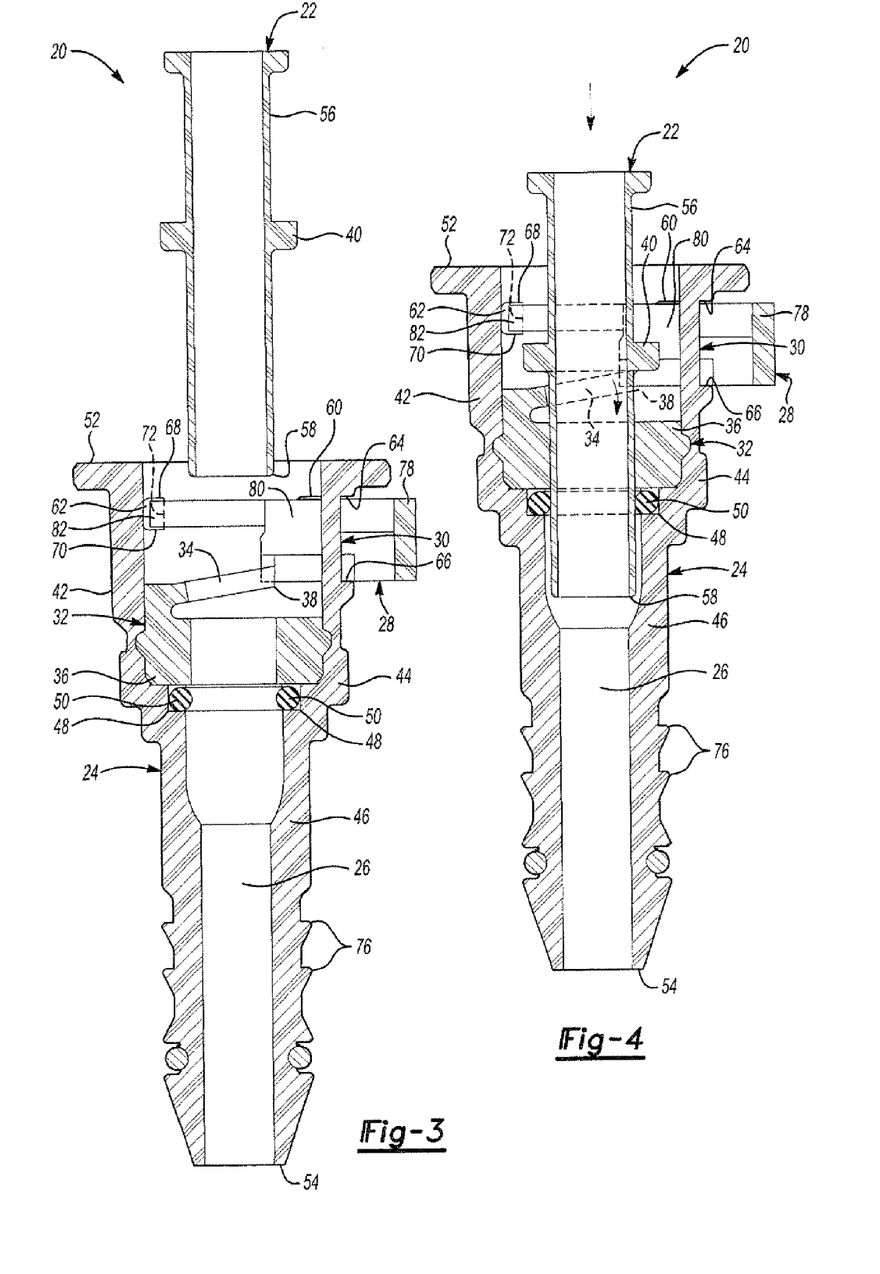
FIG. 3 is a partially exploded, cross-sectional view of the quick connector assembly showing an insertion member prior to insertion into a receiving member according to the subject invention.
FIG. 4 is a cross-sectional view of the quick connector assembly showing the insertion member being partially inserted into the receiving member and initially engaging the positioning member according to the subject invention.
Figure 5:
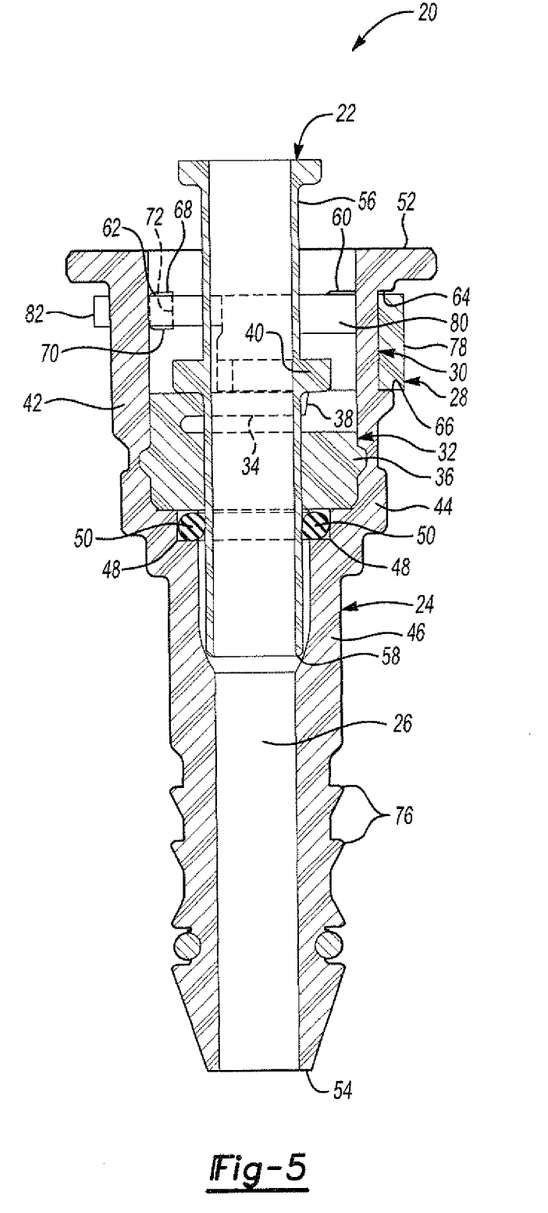
FIG. 5 is a cross-sectional view of the quick connector assembly showing the insertion member being fully inserted into the receiving member to move the biasing portion of the positioning member and allow the retaining member to be fully inserted into the receiving member according to the subject invention.
Figure 6:
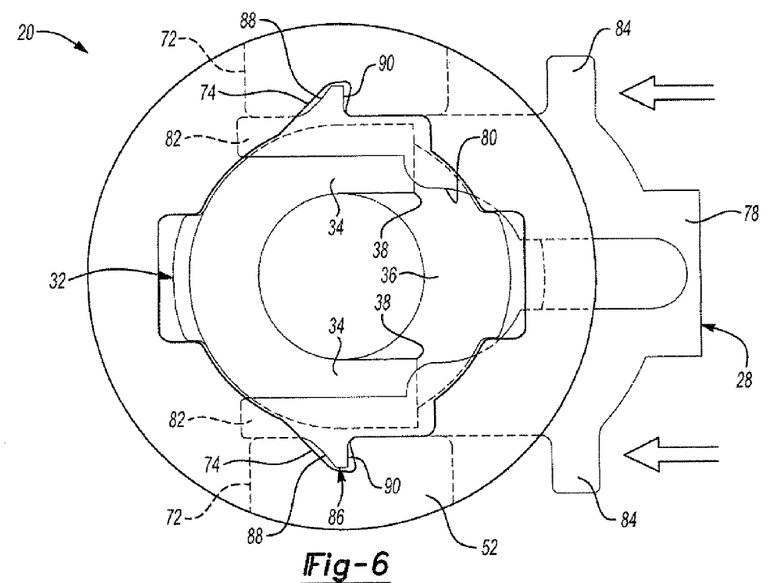
FIG. 6 is a plane view of the quick connector assembly showing the retaining member in the partially inserted position according to the subject invention.
Figure 7:
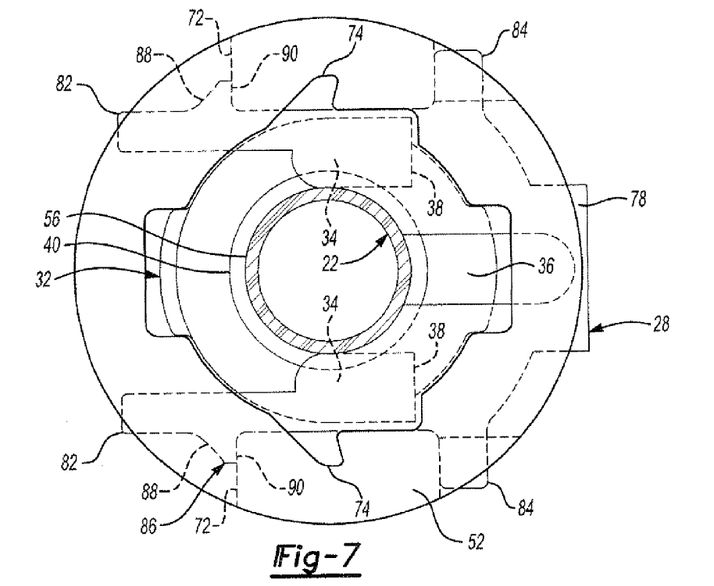
FIG. 7 is a plane view of the quick connector assembly showing the retaining member in the fully inserted position according to the subject invention.

Referring to the Figures, wherein like numerals indicate corresponding parts throughout the several views, a quick connector assembly 20 for securing an insertion member 22 within a receiving member 24 to convey fluids between the insertion member 22 and the receiving member 24, is generally shown.

The quick connector assembly 20 includes an insertion member 22 that is axial inserted along a longitudinal axis A within an axial bore 26 of a receiving member 24. A retaining member 28 is disposed in the receiving member 24 for movement in a retaining slot 30 in a direction of insertion that is perpendicular to the longitudinal axis A. A positioning member 32 is disposed in the axial bore 26 and includes a biasing portion 34 that extends angularly from a base portion 36 to a pair of blocking portions 38. The blocking portions 38 are movable between an extended position and a retracted position. The blocking portions 38 are oriented opposite the direction of insertion of the retaining member 28 to block the retaining member 28 from moving into a fully inserted position when the biasing portion 34 is in the extended position. An annular collar 40 disposed on the insertion member 22 engages the blocking portions 38 of the positioning member 32 when the insertion member 22 is axially inserted in the axial bore 26 to move the blocking portions 38 away from the retaining slot 30 and into the retracted position. As a result, the retaining member 28 is free to be moved into the fully inserted position to secure the insertion member 22 relative to receiving member 24.

The quick connector assembly 20 includes a receiving member 24 having a plurality of cylindrical portions 42, 44, 46 that define an axial bore 26 that extends along a longitudinal axis A to receive the insertion member 22 within the axial bore 26. The axial bore 26 defines an annular groove 48 therein to receive an elastic O-ring 50. The elastic O-ring 50 is disposed in the annular groove 48 to engage the insertion member 22 and seal the insertion member 22 within the axial bore 26. The receiving member 24 extends between a receiving member top 52 and a receiving member bottom 54. The receiving member 24 is a female conduit member, and while the receiving member 24 may be any material known in the art, the receiving member 24 in the exemplary embodiment is a resin tube.

The insertion member 22 includes a shaft portion 56 that extends to a beveled end 58. The insertion member 22 is axially inserted into the receiving member top 52 for placement within the axial bore 26 of the receiving member 24. The annular collar 40 of the insertion member 22 is spaced from the beveled end 58. The annular collar 40 extends outwardly from the shaft portion 56. The insertion member 22 is a male conduit member, while the insertion member 22 may be any material known in the art. The insertion member 22 in the exemplary embodiment is a resin tube.

The receiving member 24 further includes a first cylindrical portion 42 that extends downwardly from the receiving member top 52. A retaining slot 30 is defined within the receiving member 24 to receive the retaining member 28. The receiving member 24 may be received in the retaining slot 30 in two positions, a partially inserted position and a fully inserted position. The partially inserted position is where the retaining member 28 is partially inserted into the receiving member 24 to allow the insertion member 22 to be axially inserted into the axial bore 26 of the receiving member 24. The fully inserted position is where the retaining member 28 is fully inserted into the receiving member 24 to secure the insertion member 22 relative to the receiving member 24.

The retaining slot 30 includes a retaining window 60 that extends through the first cylindrical portion 42 of the receiving member 24 and a pair of corresponding retaining arm receptacles 62 that extend through the first cylindrical portion 42 of the receiving member 24 oppositely from the retaining window 60. The retaining window 60 extends through the first cylindrical portion 42 and between a window top 64 and an axially spaced window bottom 66. Each of the retaining arm receptacles 62 extend through the first cylindrical portion 42 between a receptacle top 68 and an axially spaced receptacle bottom 70. Each of the retaining arm receptacles 62 further includes a receptacle edge 72 that extends axially between the receptacle top 68 and the receptacle bottom 70. The receptacle edge 72 engages the retaining member 28 to secure the retaining member 28 within retaining slot 30 when the retaining member 28 is in the fully inserted position relative to the receiving member 24.

A retaining notch 74 is formed in the inner surface of the receiving member 24 adjacent the receiving member top 52 and between the retaining window 60 and each of the retaining arm receptacles 62. The two retaining notches 74 position the retaining member 28 in the partially inserted position relative to the receiving member 24.

The receiving member 24 further includes a second cylindrical portion 44 that is continuous with the first cylindrical portion 42. The second cylindrical portion 44 extends downwardly from the first cylindrical portion 42 and has a diameter that is less than the diameter of the first cylindrical portion 42. A nipple portion 46 extends from the second cylindrical portion 44 to the receiving member bottom 54. The nipple portion 46 includes at least one annular ridge 76 that extends radially outwardly therefrom. While in the exemplary embodiment the nipple portion 46 extends straight downwardly, the nipple portion 46 may also include a bend. For example, the nipple portion 46 may include a 90 degree bend to connect the quick connector assembly 20 to other components in tightly spaced areas.

The quick connector assembly 20 further includes a retaining member 28 for insertion into the retaining slot 30. The retaining member 28 engages the insertion member 22 to secure the insertion member 22 within receiving member 24. The retaining member 28 is inserted between the window top 64 and the window bottom 66 of the retaining window 60. The retaining member 28 is guided through the receiving member 24 between the window top 64 and the window bottom 66. During assembly, the retaining member 28 moves perpendicularly to the longitudinal axis A in a direction of insertion. In the exemplary embodiment, the direction of insertion of the retaining member 28 is the direction from the retaining window 60 towards the retaining arm receptacles 62.

The retaining member 28 first moves perpendicularly to the longitudinal axis A to the partially inserted position to allow the insertion member 22 to be received within the receiving member 24. Once the insertion member 22 has been axially inserted into the receiving member 24, the retaining member 28 may be moved in the direction of insertion to the fully inserted position. In the fully inserted position, the retaining member 28 engages the insertion member 22 and secures the insertion member 22 relative to the receiving member 24.

The retaining member 28 includes a retaining body portion 78, a rib portion 80 and a pair of retaining arms 82. The retaining body portion 78 is inserted between the window top 64 and the window bottom 66 of the retaining window 60 and guided through the receiving member 24 between the window top 64 and the window bottom 66. To avoid excess play in this movement, the axial spacing of the window top 64 and the window bottom 66 of the retaining window 60 is configured as only slightly greater than the thickness of the retaining body portion 78.

The rib portion 80 extends outwardly from the retaining body portion 78 and perpendicularly to the longitudinal axis A. The rib portion 80 is shaped to correspond to the shape of the insertion member 22, more specifically the shape of the shaft portion 56 and annular collar 40 of the insertion member 22. In the exemplary embodiment, the rib portion 80 is U-shaped and has a curved surface that is substantially equal to the curvature of the shaft portion 56 of the insertion member 22. The rib portion 80 engages the annular collar 40 when the retaining member 28 is in the fully inserted position. The rib portion 80 extends over the annular collar 40 to prevent the insertion member 22 from moving axially relative to the receiving member 24.

A pair of retaining arms 82 extend outwardly from the retaining body portion 78 perpendicularly to the longitudinal axis A. The pair of retaining arms 82 extend parallel to each other. The retaining arms 82 engage the receiving member 24 to secure the retaining member 28 in either the partially inserted position or the fully inserted position. In the fully inserted position, each of the retaining arms 82 are moved in the direction of insertion to be received in a retaining arm receptacle 62. To avoid excess play in this movement, the axial spacing of the receptacle top 68 and the receptacle bottom 70 of each of the retaining arm receptacles 62 is configured as only slightly greater than the thickness of the retaining arm 82 received therein.

The retaining body portion 78 may include a pair of projecting portions 84, with each of the projecting portions 84 extending from opposite sides of the retaining body portion 78 to extend outwardly away from each other. That is one of the projecting portions 84 disposed on one side of the retaining body portion 78 extends away from the other of the projecting portions 84 disposed on the opposite side of the retaining body portion 78. The projecting portions 84 engage the retaining window 60 as the retaining member 28 is inserted through the retaining window 60 to limit the movement of the retaining member 28 through the retaining window 60. When the retaining member 28 is inserted in the direction of insertion, the projecting portions 84 will engage the retaining window 60 to stop the movement of the retaining member 28 in the direction of insertion. The projecting portions 84 are positioned such that the movement in the direction of insertion will be stopped to correspond to the fully inserted position of the retaining member 28.

Each of the retaining arms 82 include a barb 86 that extends outwardly away from the retaining arm 82. That is one of the barbs 86 disposed on one of the retaining arms 82 extends away from the other of the barbs 86 disposed on the other of the retaining arms 82. Each of the barbs 86 may engage one of the receptacle edges 72 in the fully inserted position to secure the retaining member 28 within the receiving member 24 and secure the insertion member 22 to the receiving member 24. Alternatively, each of the barbs 86 may engage a respective one of the retaining notches 74 in the partially inserted position to temporarily secure the retaining member 28 within the receiving member 24 prior to the axial insertion of the insertion member 22 into the receiving member 24.

Each of the barbs 86 includes in angled portion 88 disposed in the direction of insertion. This angled portion 88 allows the barbs 86 to be guided through the retaining slot 30 with minimal resistance. In addition, each of the barbs 86 includes a flat portion 90 that is oriented opposite the direction of insertion. The flat portion 90 of the barb 86 engages one of the receptacle edges 72 when the retaining member 28 is in its fully inserted position. The positioning of the flat portion 90 against the receptacle edge 72 limits movement of the retaining member 28 in a direction opposite of insertion. Once the retaining member 28 has been inserted into the fully inserted position, the retaining member 28 is locked relative to the receiving member 24. As such, a more secure connection is formed.

The quick connector assembly 20 further includes a positioning member 32 having a base portion 36 and a biasing portion 34. In the exemplary embodiment, the positioning member 32 is a separate and distinct structure from the receiving member 24 and retaining member 28. That is, the positioning member 32 is not unitary with either the receiving member 24 or the retaining member 28. The biasing portion 34 extends angularly from the base portion 36 to a pair of blocking portions 38. The base portion 36 is annular and disposed within the axial bore 26 of the receiving member 24. Within the axial bore 26, the base portion 36 is disposed above the O-ring 50 to sandwich the O-ring 50 between the positioning member 32 and the annular groove 48. The shaft portion 56 of the insertion member 22 is axially inserted through the annular base portion 36.

The biasing portion 34 extends angularly from the top of the base portion 36 of the positioning member 32 and is moveable between an extended position and a retracted position. In the extended position, the biasing portion 34 blocks the retaining member 28 from being fully inserted into the retaining slot 30 of receiving member 24. In the extended position, the blocking portions 38 of the biasing member are positioned to limit the movement of the retaining member 28 to only the partially inserted position. In the retracted position, the retaining member 28 is free to be moved to the fully inserted position. That is, the retaining member 28 is no longer blocked, thus enabling the retaining member 28 to be moved in the direction of insertion to the fully inserted position.

The biasing portion 34 is biased towards the receiving member top 52 of the receiving member 24. The biasing portion 34 extends to the pair of blocking portions 38 that are oriented opposite the direction of insertion of the retaining member 28. The orientation of the blocking portions 38 block the retaining member 28 from movement into the fully inserted position when the biasing portion 34 is in the extended position. In the extended position, the blocking portions 38 are disposed in the axial bore 26 adjacent the window bottom 66 of the retaining slot 30 to block the movement of the retaining member 28 along the window bottom 66 and through the receiving member 24.

During assembly, the insertion member 22 is inserted into the axial bore 26 in a direction opposite the bias of the biasing portion 34. The annular collar 40 of the insertion member 22 engages the blocking portions 38 of the biasing portion 34 to move the blocking portions 38 away from the extended position to the retracted position. Once in the retracted position, the retaining member 28 may be moved into the fully inserted position relative to the receiving member 24 to engage the insertion member 22 and secure the insertion member 22 relative to the receiving member 24. As a result, proper assembly of the quick connector assembly 20 is assured.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A quick connector assembly for securing an insertion member within a receiving member to convey fluids between the insertion member and the receiving member, comprising:
a receiving member defining an axial bore extending along a longitudinal axis between a receiving member top and a receiving member bottom and a retaining slot extending perpendicularly to said longitudinal axis and through said receiving member;
an insertion member having an annular collar extending outwardly from a shaft portion for axial insertion within said axial bore of said receiving member;
a retaining member for movement in a direction of insertion in said retaining slot to a fully inserted position to engage said insertion member and secure said insertion member relative to said receiving member; and
a positioning member disposed in said axial bore and having a base portion and a biasing portion biased towards said receiving member top and extending angularly from said base portion to a pair of blocking portions being movable between an extended position and a retracted position and oriented opposite the direction of insertion of said retaining member for blocking said retaining member from moving through said retaining slot into the fully inserted position when said biasing portion is in the extended position;
wherein said annular collar of said insertion member engages said blocking portions of said positioning member when said insertion member is axially inserted in said axial bore in a direction opposite the bias of said biasing portion for moving said blocking portions away from said retaining slot and into the retracted position to allow said retaining member to be moved into the fully inserted position to engage said insertion member and secure said insertion member relative to said receiving member.

2. The quick connector assembly as set forth in claim 1 wherein said retaining slot includes a retaining window extending through said receiving member and a pair of corresponding retaining arm receptacles extending through said receiving member at a portion of said receiving member opposite said retaining window.

3. The quick connector assembly as set forth in claim 2 wherein said receiving member includes a retaining notch formed in an inner surface of said receiving member adjacent said receiving member top and between said retaining window and each of said retaining arm receptacles for positioning the retaining member in a partially inserted position relative to said receiving member.

4. The quick connector assembly as set forth in claim 3 wherein the partially inserted position is said retaining member being partially inserted into said receiving member for allowing said insertion member to be axially inserted into said axial bore of said receiving member prior to said retaining member being moved into the fully inserted position to engage said insertion member.

5. The quick connector assembly as set forth in claim 2 wherein said retaining window extends through said receiving member and between a window top and an axially spaced window bottom, said retaining member being inserted between said window top and said window bottom of said retaining window and being guided through said retaining slot between said window top and said window bottom.

6. The quick connector assembly as set forth in claim 5 wherein said blocking portions are disposed adjacent said window bottom in said axial bore to block the movement of said retaining member along said window bottom and through said retaining slot when said biasing portion is in an extended position.

7. The quick connector assembly as set forth in claim 2 wherein each of said retaining arm receptacles extend through said receiving member and between a receptacle top and an axially spaced receptacle bottom, and further include a receptacle edge that extends axially between said receptacle top and said receptacle bottom for engaging the retaining member and securing the retaining member within retaining slot when the retaining member is in the fully inserted position relative to said receiving member.

8. The quick connector assembly as set forth in claim 7 further including a pair of retaining arms extending outwardly from said retaining body portion and perpendicularly to said longitudinal axis for engaging said retaining slot to secure said retaining member in one of a partially inserted position and the fully inserted position.

9. The quick connector assembly as set forth in claim 8 wherein each of said retaining arms include a barb, with one of said barbs disposed on one of said retaining arms extending outwardly away from the other of said barbs disposed on the other of said retaining arms, and wherein each of said barbs engage one of said receptacle edges in the fully inserted position for securing said retaining member within said receiving member and securing said insertion member to said receiving member.

10. The quick connector assembly as set forth in claim 9 wherein said receiving member includes a retaining notch formed in the inner surface of said receiving member adjacent said receiving member top and between said retaining window and each of said retaining arm receptacles, and wherein each of said barbs engage one of said retaining notches for positioning said retaining member in the partially inserted position to temporarily secure said retaining member within said receiving member prior to the axial insertion of said insertion member into said receiving member.

11. The quick connector assembly as set forth in claim 2 wherein the direction of insertion of said retaining member is from said retaining window towards said retaining arm receptacles.

12. The quick connector assembly as set forth in claim 1 wherein the direction of insertion of said retaining member is perpendicular to said longitudinal axis.

13. The quick connector assembly as set forth in claim 1 wherein said retaining member includes a retaining body portion and a rib portion extending outwardly from said retaining body portion and perpendicularly to said longitudinal axis, said rib portion being shaped to correspond to the shape of said insertion member for engaging said insertion member when said retaining member is in the fully inserted position.

14. The quick connector assembly as set forth in claim 1 wherein said receiving member includes a plurality of cylindrical portions defining said axial bore extending along said longitudinal axis between said receiving member top and said receiving member bottom.

15. The quick connector assembly as set forth in claim 1 further including an annular groove defined in said axial bore and an elastic O-ring disposed in said annular groove for engaging said insertion member to seal said insertion member within said axial bore.

16. The quick connector assembly as set forth in claim 15 wherein said base portion of said positioning member is annular and disposed within said axial bore and adjacent said O-ring for sandwiching said O-ring between said positioning member and said annular groove.

17. The quick connector assembly as set forth in claim 1 wherein said insertion member includes a shaft portion that extends to a beveled end for axial insertion into said receiving member top and placement within said axial bore, said annular collar being spaced from said beveled end.

18. The quick connector assembly as set forth in claim 1 wherein said base portion is annular and said shaft portion of said insertion member is axially inserted through said annular base portion.

\* \* \* \* \*